(12) United States Patent
Igarashi

(10) Patent No.: US 8,783,295 B2
(45) Date of Patent: Jul. 22, 2014

(54) FLUIDIC DEVICE UNIT STRUCTURE

(75) Inventor: Hiroki Igarashi, Gyoda (JP)

(73) Assignee: Surpass Industry Co., Ltd., Gyoda-Shi (JP)

( * ) Notice: Subject to any disclaimer, the term of this patent is extended or adjusted under 35 U.S.C. 154(b) by 677 days.

(21) Appl. No.: 12/279,811

(22) PCT Filed: Mar. 2, 2007

(86) PCT No.: PCT/JP2007/054095
§ 371 (c)(1),
(2), (4) Date: Aug. 18, 2008

(87) PCT Pub. No.: WO2007/100106
PCT Pub. Date: Sep. 7, 2007

(65) Prior Publication Data
US 2010/0229963 A1    Sep. 16, 2010

(30) Foreign Application Priority Data

Mar. 2, 2006  (JP) ................................. 2006-055853
Jun. 2, 2006  (JP) ................................. 2006-154613

(51) Int. Cl.
*F15B 13/00*  (2006.01)
*F16K 11/20*  (2006.01)
*F16K 51/00*  (2006.01)

(52) U.S. Cl.
USPC ............ 137/884; 137/271; 137/597; 251/142

(58) Field of Classification Search
USPC ................... 251/142; 137/269, 271, 884, 597
See application file for complete search history.

(56) References Cited

U.S. PATENT DOCUMENTS

| 3,589,387 | A | | 6/1971 | Raymond |
| 4,930,538 | A | * | 6/1990 | Browne ........................ 137/269 |
| 5,819,782 | A | * | 10/1998 | Itafuji ............................ 137/240 |
| 5,967,489 | A | * | 10/1999 | Nakazawa et al. ............ 251/148 |
| 5,988,217 | A | * | 11/1999 | Ohmi et al. ................. 137/614.2 |
| 6,035,893 | A | * | 3/2000 | Ohmi et al. .................... 137/597 |
| 6,116,283 | A | * | 9/2000 | Yamaji et al. ................. 137/884 |
| 6,142,539 | A | | 11/2000 | Redemann et al. |
| 6,152,175 | A | * | 11/2000 | Itoh et al. ....................... 137/602 |
| 6,186,177 | B1 | | 2/2001 | Maher |
| 6,209,571 | B1 | * | 4/2001 | Itoh et al. ....................... 137/240 |
| 6,273,139 | B1 | * | 8/2001 | Ohmi et al. .................... 137/884 |
| 6,615,871 | B2 | | 9/2003 | Ohmi et al. |

(Continued)

FOREIGN PATENT DOCUMENTS

GB  2162921 A  2/1986
JP  11-294698 A  10/1999

(Continued)

OTHER PUBLICATIONS

Office Action for JP 2006-158407, dated Jul. 12, 2011.

(Continued)

*Primary Examiner* — John K Fristoe, Jr.
*Assistant Examiner* — Hailey K Do
(74) *Attorney, Agent, or Firm* — Thomas, Karceski & Karmilovich, PC

(57) ABSTRACT

A fluidic device unit structure in which a plurality of fluidic devices are integrated and which is effective in reducing a footprint is provided. With a fluidic device unit structure in which a plurality of fluid devices that are connected via channels are integrated in a base member, the base member includes a plurality of mounting surfaces on which the fluidic devices are mounted and inclined channels for connecting the mounting surfaces in the interior of the base member.

22 Claims, 15 Drawing Sheets

(56) References Cited

U.S. PATENT DOCUMENTS

| | | | |
|---|---|---|---|
| 6,830,067 B2 | 12/2004 | Hayashi | |
| 7,152,629 B2* | 12/2006 | Tokuda et al. | 137/884 |
| 7,418,978 B2* | 9/2008 | Chao et al. | 137/884 |
| 2005/0274421 A1* | 12/2005 | Abe | 137/606 |
| 2005/0284528 A1* | 12/2005 | Chao et al. | 137/884 |

FOREIGN PATENT DOCUMENTS

| | | |
|---|---|---|
| JP | 2000-120903 A | 4/2000 |
| JP | 2003-185039 | 3/2003 |
| JP | 2004-183743 | 7/2003 |
| JP | 2004-316667 | 11/2004 |
| JP | 2005-273868 A | 10/2005 |
| JP | 2005-307994 A | 11/2005 |
| WO | WO 01/16512 A1 | 3/2001 |

OTHER PUBLICATIONS

Search Report for corresponding European Patent Application No. 07715176.9, mailed on Sep. 21, 2012.

* cited by examiner

FLUIDIC DEVICE UNIT STRUCTURE

CROSS-REFERENCE TO RELATED APPLICATIONS

This application is a National Phase Application based upon and claiming the benefit of priority to PCT/JP2007/054095, filed on Mar. 2, 2007, which is based upon and claims the benefit of priority to both Japanese Patent Application No. 2006-055853, filed Mar. 2, 2006, and Japanese Patent Application No. 2006-154613, filed Jun. 2, 2006, the contents of both of which are incorporated herein by reference.

TECHNICAL FIELD

The present invention relates to a fluidic device unit structure in which fluidic devices such as valves and pressure switches are integrated.

BACKGROUND ART

Conventional known devices for handling fluids, such as chemicals or the like, are configured such that various fluidic devices (various sensors, such as valves, regulators, pressure sensors; and various switches, such as pressure switches) serving as constituent parts are integrated by connecting them with pipes.

In addition, when using a plurality of chemical solution fluidic devices, as with a semiconductor manufacturing apparatus for example, a known configuration in which chemical solution fluidic devices can be connected without using pipes has been proposed. This structure enables the overall size of the devices to be reduced because the pipes are unnecessary (for example, see Patent Document 1).

Patent Document 1: Japanese Unexamined Patent Application, Publication No. 2000-120903 (see FIG. 1)

SUMMARY OF THE INVENTION

Recently, there have been demands for developing a fluidic device unit structure in which a plurality of fluidic devices are integrated with the aim of reducing the footprint (projection area in plan view), which is effective in reducing the size of the device by reducing spaces for attaching components, reducing the number of leak-points, which is effective in improving the reliability of the devices and simplifying maintenance, and reducing the dead volume, which enables effective use of the fluid.

However, with the connecting structure disclosed in the above-described Patent Document 1, because the channels of the chemical solution fluidic devices are linearly connected, i.e., an inline type, or are of a type in which a plurality of valves are connected in parallel using a manifold base, the reduction of the footprint is limited. One type, that is, the inline type, is not suitable for integration because of its structure in which the entire length in a straight line becomes large, and the other type, using the manifold base, is not preferable because the manifold base causes an increase in the footprint.

In addition, since known check valves are the inline type, the overall length thereof becomes large; therefore, it is not suitable for the integration for reducing the footprint.

The present invention has been conceived in light of the circumstances described above, and an object thereof is to provide a fluidic device unit structure in which a plurality of the fluidic devices are integrated and which is effective in reducing the footprint.

Furthermore, it is also an object to develop a check valve suitable for integrating the fluidic devices and to reduce the footprint of the fluidic device unit structure even more.

To solve the problems described above, the present invention employs the following solutions. The present invention is a fluidic device unit structure in which a plurality of fluidic devices that are connected via channels are integrated in a base member, wherein the base member includes a plurality of mounting surfaces on which the fluidic devices are mounted and inclined channels for connecting the mounting surfaces in the interior of the base member.

According to this fluidic device unit structure, because the base member includes the plurality of mounting surfaces on which the fluidic devices are mounted and the inclined channels for connecting the mounting surface in the interior of the base member, the fluidic devices mounted on the mounting surfaces are connected inside the base member without using a pipe. Accordingly, the number of leak points that are to be sealed can be reduced, and moreover, the footprint can be reduced by reducing the gap between the devices because the neighboring fluidic devices can be connected by the inclined channels.

In addition, in the invention described above, the mounting surfaces preferably have different heights. In this way, gaps between the devices can be minimized because it is possible to easily machine the inclined channels having a large inclining angle using a tool such as a drill.

The present invention is a fluidic device unit structure in which a plurality of fluidic devices that are connected via channels are integrated in base member, wherein a valve-member housing for a check valve is formed in the base member, and a fluid inlet and a fluid outlet for communicating with the valve-member housing are provided so as to cross at a desired angle.

According to this fluidic device unit structure, the valve-member housing of the check valve is formed in the base member, and the fluid inlet and the fluid outlet for communicating with the valve-member housing are provided so as to cross at a desired angle. Accordingly, it is possible to install the check valve having desired angles at the fluid inlet and the fluid outlet.

In this case, fluid flowing in the channel preferably passes through a lower end of the valve-member housing. In this way, it is possible to prevent the fluid from being retained in the interior of the valve-member housing.

With the above-described fluidic device unit structure, it is preferable that a casing member of the fluidic devices be divided into multiple parts in a direction joining with the base member, a female threaded portion penetrating in the joining direction be formed in a base-side member of the casing member, which is disposed at a position in close contact with the base member, and the base-side member be held and tightened by screwing separate bolts into the female threaded portion from both sides. In this way, a tightening force can be easily adjusted, thus enabling each sealing portion to be uniformly tightened.

According to the fluidic device unit structure of the present invention described above, it is possible to provide the fluidic device unit structure in which the plurality of fluidic devices are integrated in the base member, and particularly, which is effective in reducing the footprint.

In addition, because a check valve suitable for integrating the fluidic device can be obtained, the footprint of the above-described fluidic device unit structure can be reduced even more.

DETAILED DESCRIPTION OF EMBODIMENT(S) OF THE INVENTION

An embodiment of a fluidic device unit structure according to the present invention will be described below with reference to the drawings.

Figure 4:
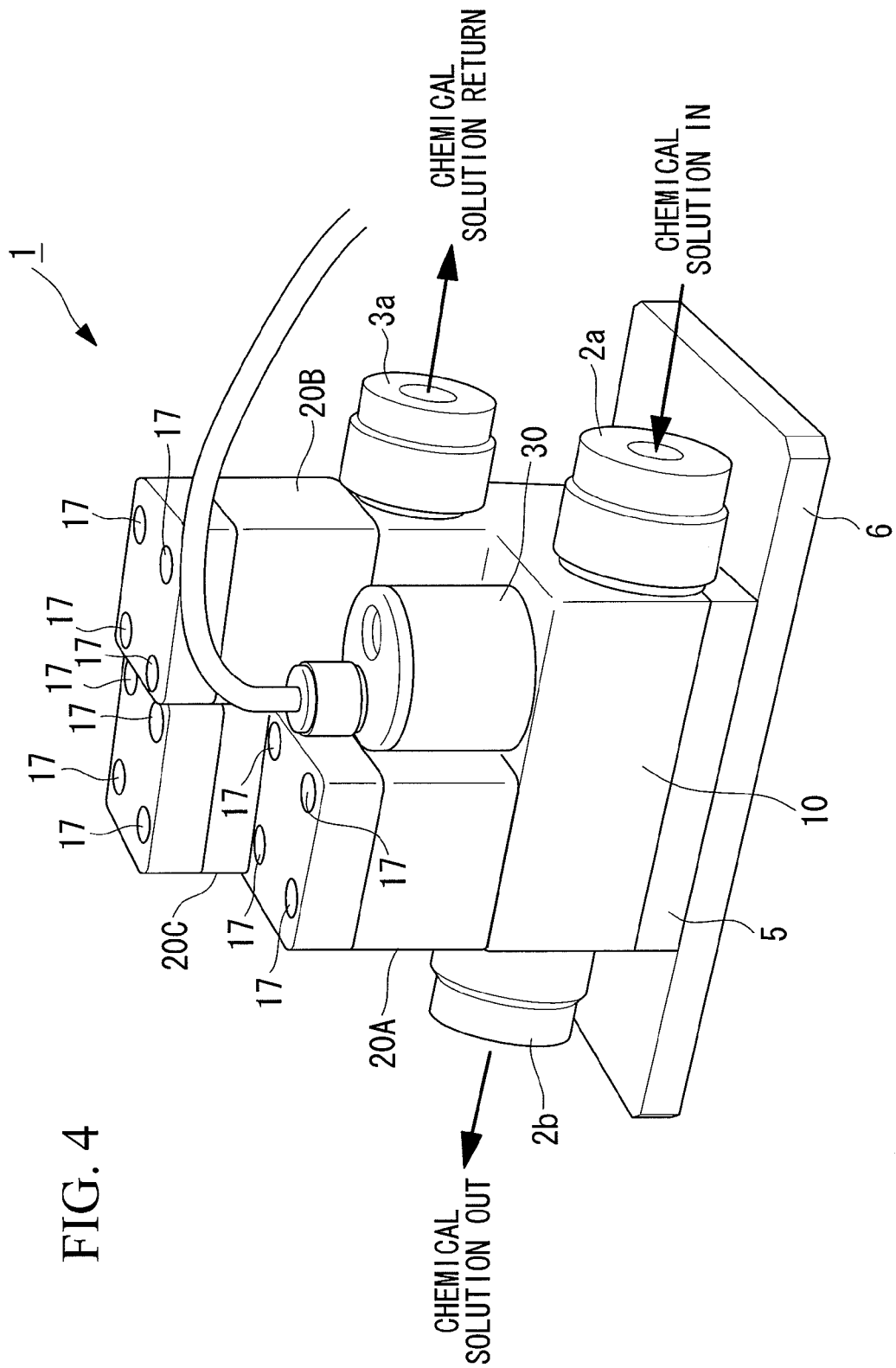
FIG. 4 is an external perspective view showing an embodiment of a fluidic device unit structure according to the present invention.
Figure 5:
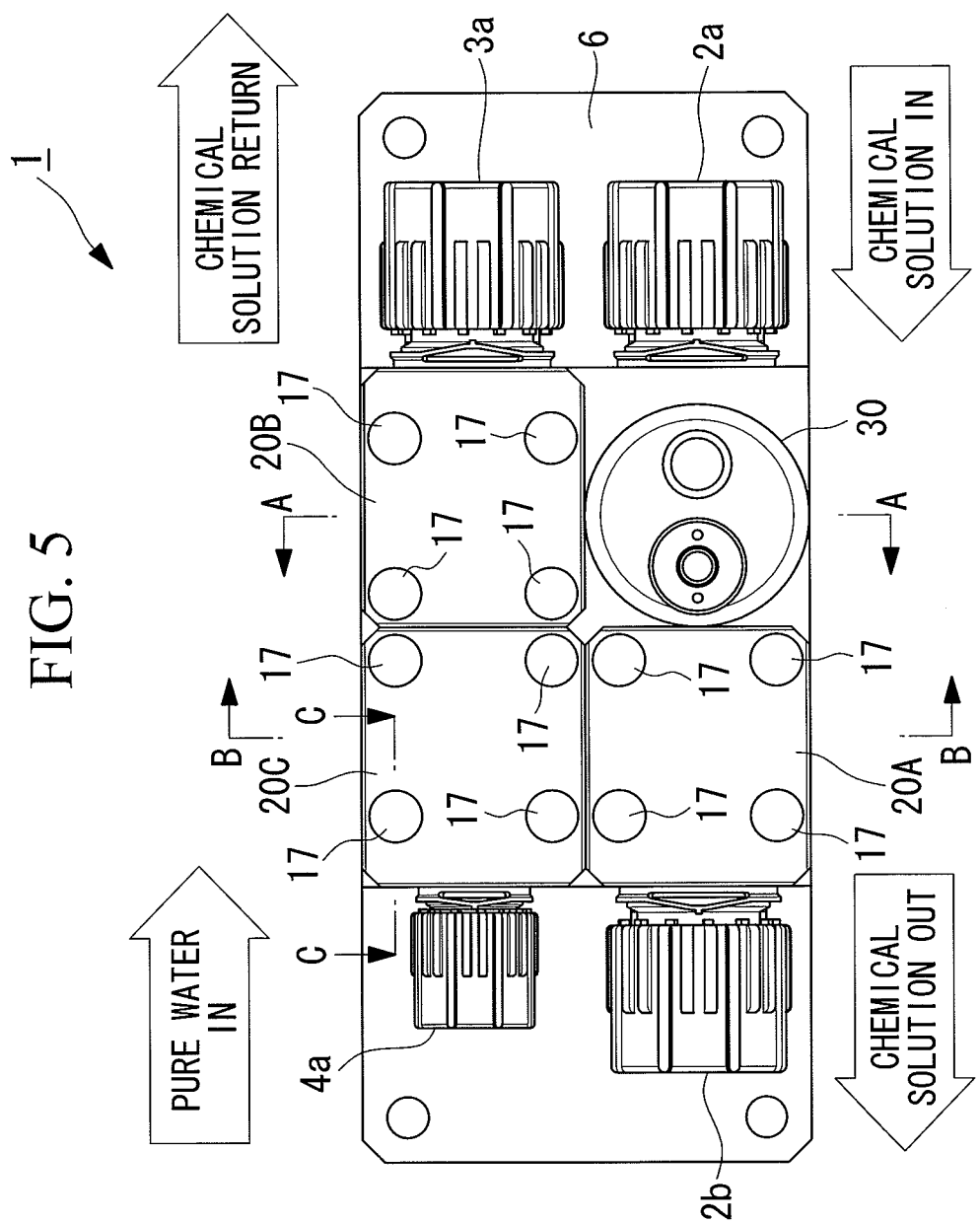
FIG. 5 is a plan view of FIG. 4.

A fluidic device unit 1 shown in FIGS. 4 and 5 has a structure in which a plurality of fluidic devices connected by channels are integrated in a base member 10. In the example configuration shown in the drawings, the main parts of the fluidic device unit 1 are made of fluorocarbon resin having chemical resistance, and three pneumatically operated valves 20A, 20B, and 20C, a pressure sensor 30, and a check valve 40 are used as the fluidic devices, which are integrated in the base member 10. Reference numeral 5 in the drawings denotes a base securing plate, and 6 denotes a unit base plate.

Figure 6:
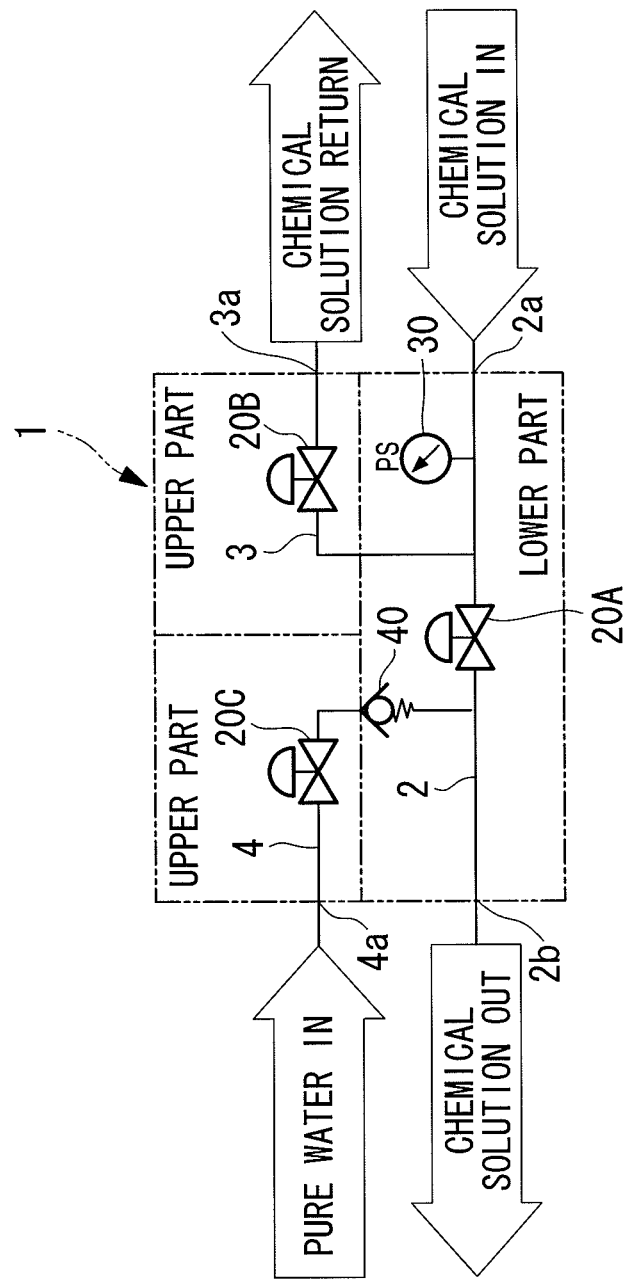
FIG. 6 is a system diagram showing an example channel configuration of the fluidic device unit shown in FIG. 4.
Figure 7:
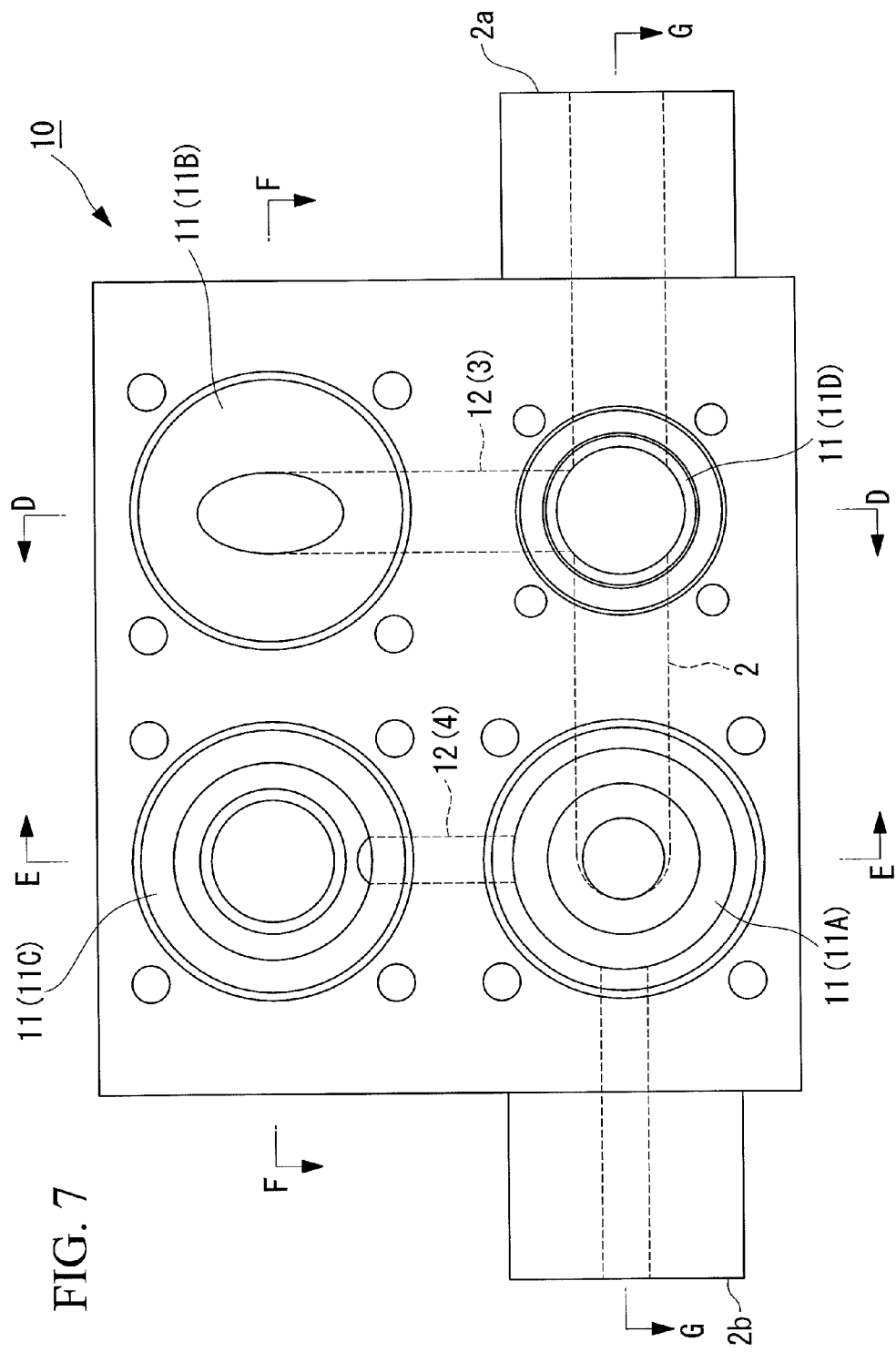
FIG. 7 is a plan view showing an example configuration of a base member.

In addition, FIG. 6 shows the configuration of a channel (circuit) of the fluidic device unit 1. In this example channel configuration, a first pneumatically operated valve 20A and a pressure sensor 30 are provided in a chemical solution channel 2, a second pneumatically operated valve 20B is provided in a chemical solution return channel 3 that is split off from the upstream side of the first pneumatically operated valve 20A, and a third pneumatically operated valve 20C and a check valve 40 are provided in a pure water channel 4 that is combined at the downstream side of the first pneumatically operated valve 20A. Reference numeral 2a in the drawing denotes a chemical solution inlet, 2b denotes a chemical solution outlet, 3a denotes a chemical solution return outlet, and 4a denotes a pure water inlet.

As shown in FIGS. 7 to 11, the base member 10 includes, for example, a plurality of mounting surfaces 11 having different heights, provided for mounting the above-described fluidic devices, and inclined channels 12 that connect these mounting surfaces inside the base member 10.

In this case, the base member 10 has a substantially rectangular block shape, and four mounting surfaces 11 are provided thereon in such a manner that each center position represents a rectangular shape for mounting the above-described fluidic devices thereon. In the following description, the mounting surface on which the first pneumatically operated valve 20A is provided is a first mounting surface 11A, the mounting surface on which the second pneumatically operated valve 20B is provided is a second mounting surface 11B, the mounting surface on which the third pneumatically operated valve 20C is provided is a third mounting surface 11C, and the mounting surface on which the pressure sensor 30 is provided is a fourth mounting surface 11D.

Figure 9:
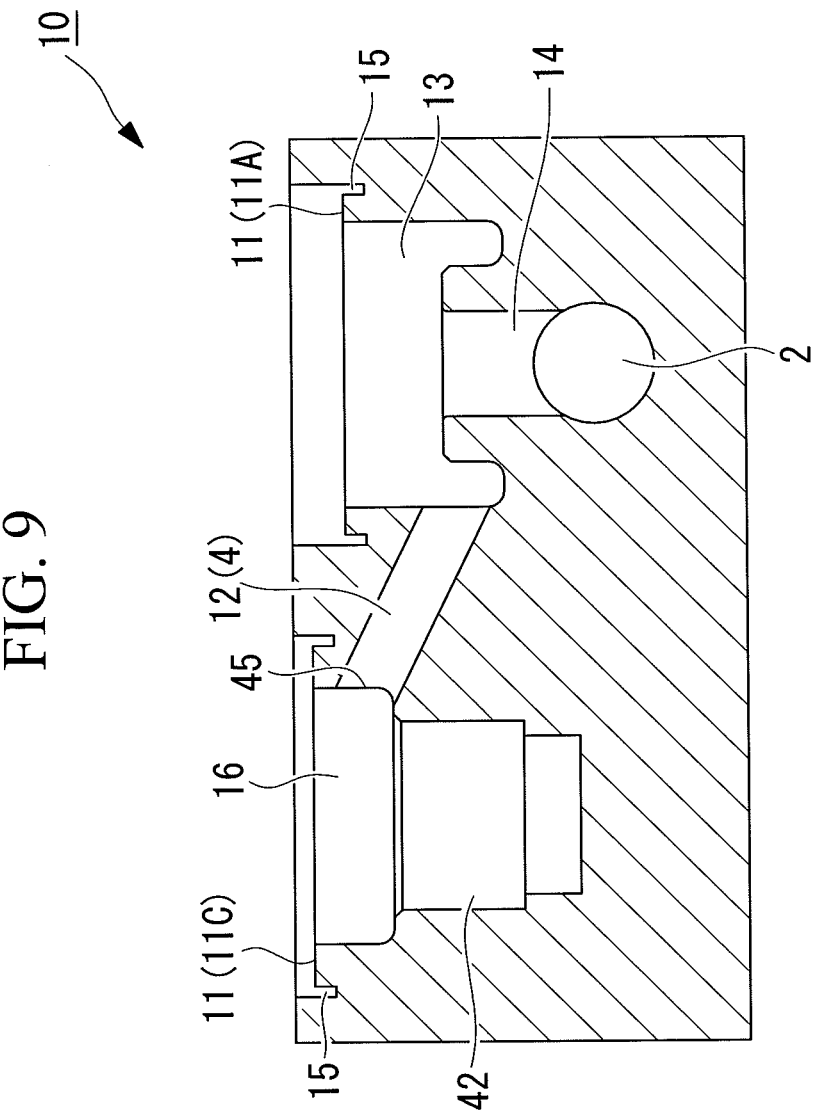
FIG. 9 is a sectional view taken along line E-E in FIG. 7.
Figure 10:
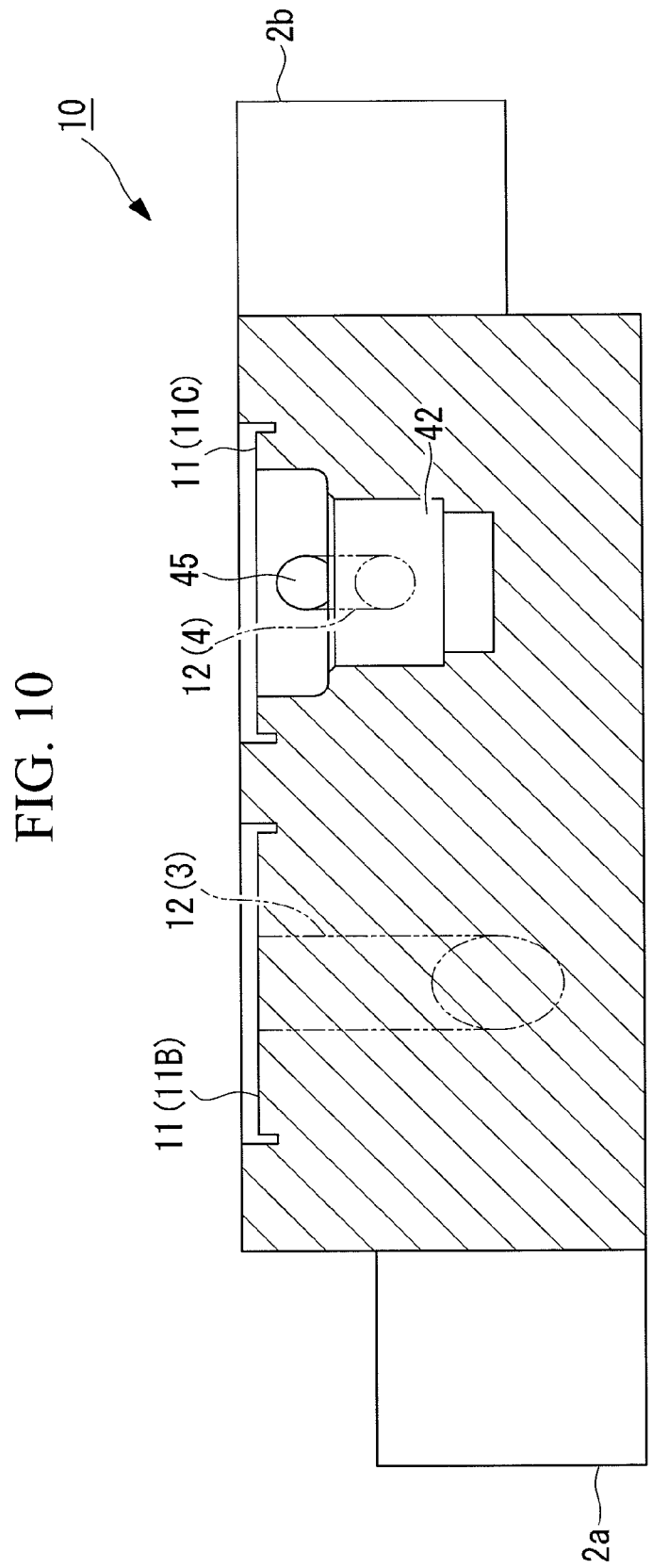
FIG. 10 is a sectional view taken along line F-F in FIG. 7.

As shown in FIG. 9, the first mounting surface 11A is a low-step mounting surface that is formed as if the top surface of the base member 10 is depressed. In addition, as shown in FIG. 2 for example, a cylindrical space 13 for accommodating a valve member 21 of the pneumatically operated valve 20A is formed below the first mounting surface 11A, and a vertical channel portion 14 is further formed below the cylindrical space 13 to communicate with the chemical solution channel 2 formed in a tunnel shape that horizontally penetrates the interior of the housing of the base member 10.

Reference numeral 15 in the drawing represents a ring-shaped recessed portion. By inserting a protruding portion formed at a diaphragm Df of the pneumatically operated valve 20A into the ring-shaped recessed portion 15, a joint sealing structure is formed between the base member 10 and the pneumatically operated valve 20A. In addition, an actuator Ac for opening and closing the valve by pneumatic pressure is disposed above the diaphragm Df.

Figure 2:
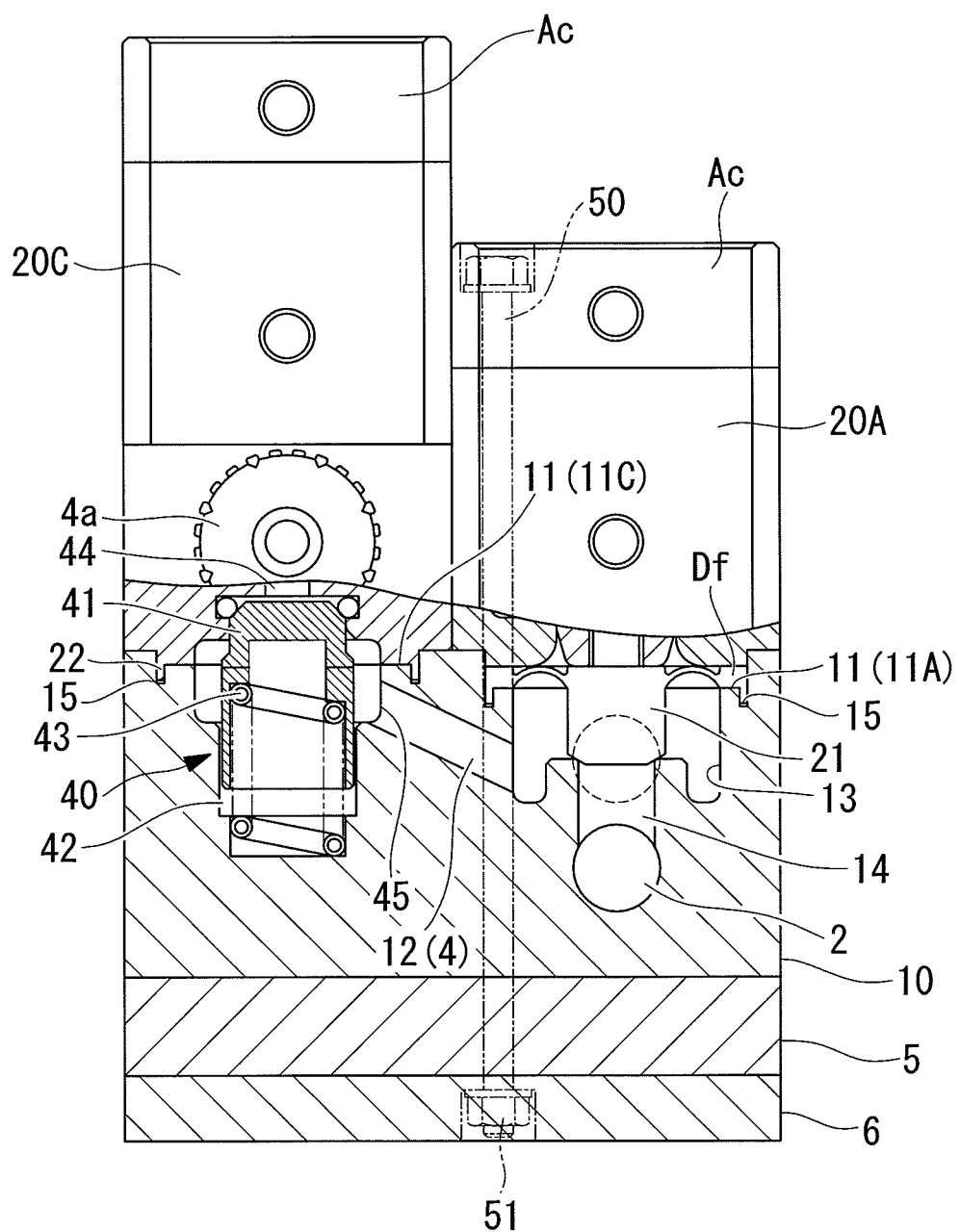
FIG. 2 is a sectional view of principal parts (taken along line B-B in FIG. 5), showing an embodiment of a fluidic device unit structure according to the present invention.

The pneumatically operated valve 20A is attached to the first mounting surface 11A of the base member 10 that is formed in this way by inserting the pneumatically operated valve 20A from above, and, for example, as indicated by the imaginary line in FIG. 2, by tightening it with a through-bolt 50 and a nut 51, thus firmly maintaining the joint sealing structure that is formed by fitting the ring-shaped recessed portion 15 into the diaphragm Df. In addition, regarding the through-bolt 50 and the nut 51 employed here, a split bolt structure, described below, may be employed.

As shown in FIG. 9, the third mounting surface 11C is a high-step mounting surface that is formed so as to substantially align with the top surface of the base member 10. In other words, the third mounting surface 11C is located at a higher position than the first mounting surface 11A described above. In addition, below the third mounting surface 11C, as shown in FIG. 2 for example, a cylindrical space in a valve-member housing 42 is formed below a channel space 16 so as to accommodate a valve member 41 of the check valve 40. Reference numeral 15 in the drawing denotes a ring-shaped recessed portion in which a ring-shaped protruding portion provided at the bottom portion of the fluidic device side is press-fitted when attaching the fluidic device, as required, to form the joint sealing structure.

At the third mounting surface 11C of the base member 10 formed in this way, after fitting the valve member 41 having a spring 43 into the valve-member housing 42 from above, the pneumatically operated valve 20C is attached to the third mounting surface 11C by inserting it from above and is secured with a bolt 17 having a split bolt structure, described below. The joint in this case is sealed by fitting the ring-shaped protruding portion 22 into the ring-shaped recessed portion 15.

The check valve 40 shown in the drawing is configured such that the fluid flowing in from a fluid inlet 44 provided thereabove flows out into an inclined channel 12 downwardly inclining from a fluid outlet 45 that opens at a side surface of the valve-member housing 42. Specifically, with the fluidic device unit 1 in which the fluidic devices are integrated in the base member 10 described above, the valve-member housing 42 having the check valve 40 is formed in the base member 10, and the fluid inlet 44 and the fluid outlet 45 that communicate with the valve-member housing 42 are provided so as to cross at a desired angle, for example, flowing in from the above and flowing out horizontally.

If this type of check valve 40 is used for the fluidic device unit 1, it is effective to minimize the entire unit because the fluid inlet 44 and the fluid outlet 45 communicating with the valve-member housing 42 can be provided so as to cross at a desired angle. In other words, unlike the conventional inline type, since the fluid inlet 44 and the fluid outlet 45 have a desired angle, it is possible, in particular, to reduce the area of the mounting surface in plan view.

The valve-member housing 42 having the above described configuration also has a space for accommodating the spring 43 at a position lower than the opening of the fluid outlet 45. Accordingly, the fluid flowing into the valve-member housing 42 is retained at the space that is lower than the fluid outlet 45 with almost no displacement. Therefore, this space becomes a dead volume of the fluid, and moreover, there may be adverse effects on the purity due to mixing with fluid that is degraded because of its retention for a long period of time.

Accordingly, regarding the inlet and the outlet for the fluid flowing through the valve-member housing 42, a modification having a configuration in which the fluid flowing in the channel flows through the lower end portion of the valve-member housing 42 will be described with reference to FIGS. 14 and 15. Parts that are identical to those in the above-described embodiment are assigned the same reference numerals, and a detailed description thereof will be omitted.

Figure 14:
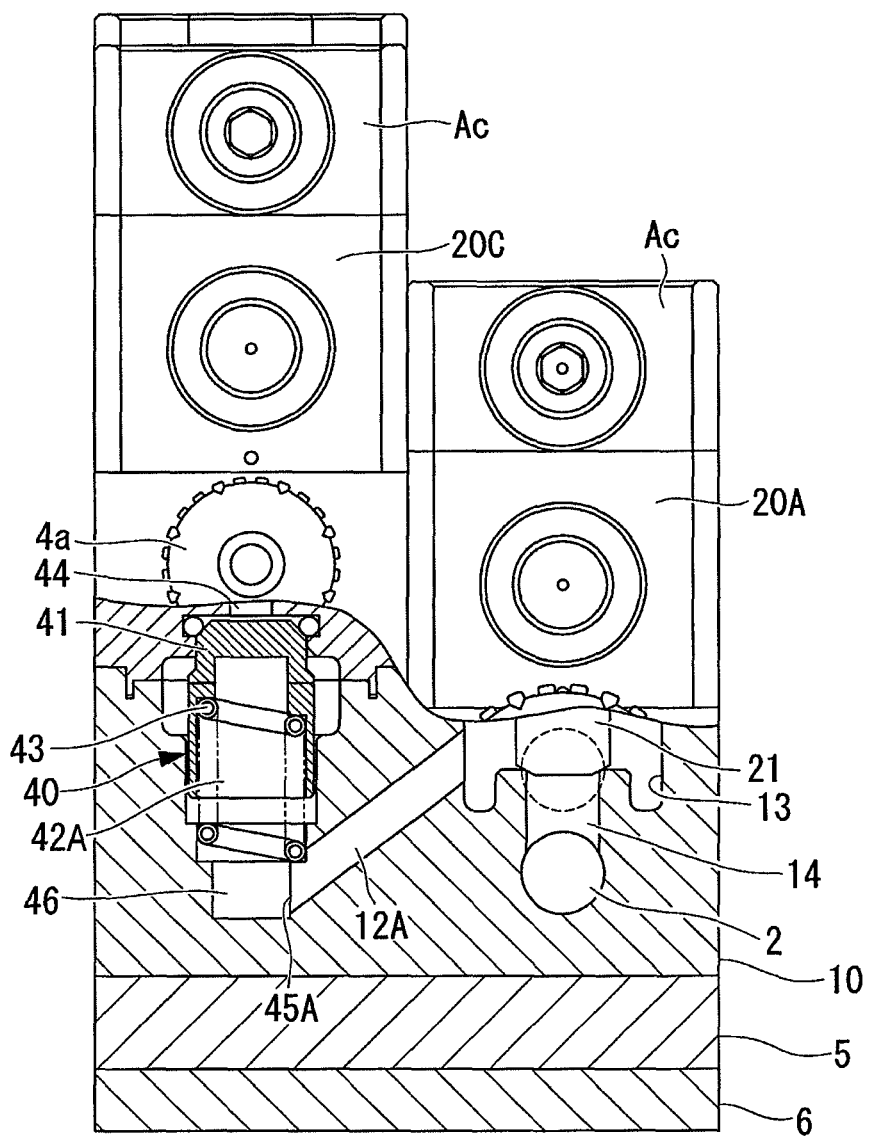
FIG. 14 is a sectional view of principal parts showing a first modification of a valve-member housing in FIG. 2.

In a first modification shown in FIG. 14, a valve-member housing 42A formed in the base member 10 has a connecting space 46 that extends downward from the spring 43. Since the bottom surface of this connecting space 46 corresponds to the lowest end portion of the valve-member housing 42A, a fluid outlet 45A is disposed at the side surface close to the bottom surface.

The fluid outlet 45A and the cylindrical space 13 that accommodates the valve member 21 for the pneumatically operated valve 20A are connected by an inclined channel 12A formed inside the base member 10. The inclined channel 12A in this case is upwardly inclined from the connecting space 46 toward the cylindrical space 13.

With this configuration, when flowing through the check valve 40, the fluid always flows through the connecting space 46 that is at the lowest position in the valve-member housing 42A. Accordingly, the fluid, which is retained in the connecting space 46 due to closing of the check valve 40, flows out in such a manner as to be pushed out from the connecting space 46 every time the check valve 40 opens and is then replaced. Accordingly, it is possible to prevent the fluid from being retained in the valve-member housing 42A for a long period of time without being replaced and also to prevent the connecting space 46 from becoming a dead volume of the fluid. With the first modification having such a configuration, the retention can be prevented without increasing the height of the portion where the check valve 40 is installed.

Figure 15:
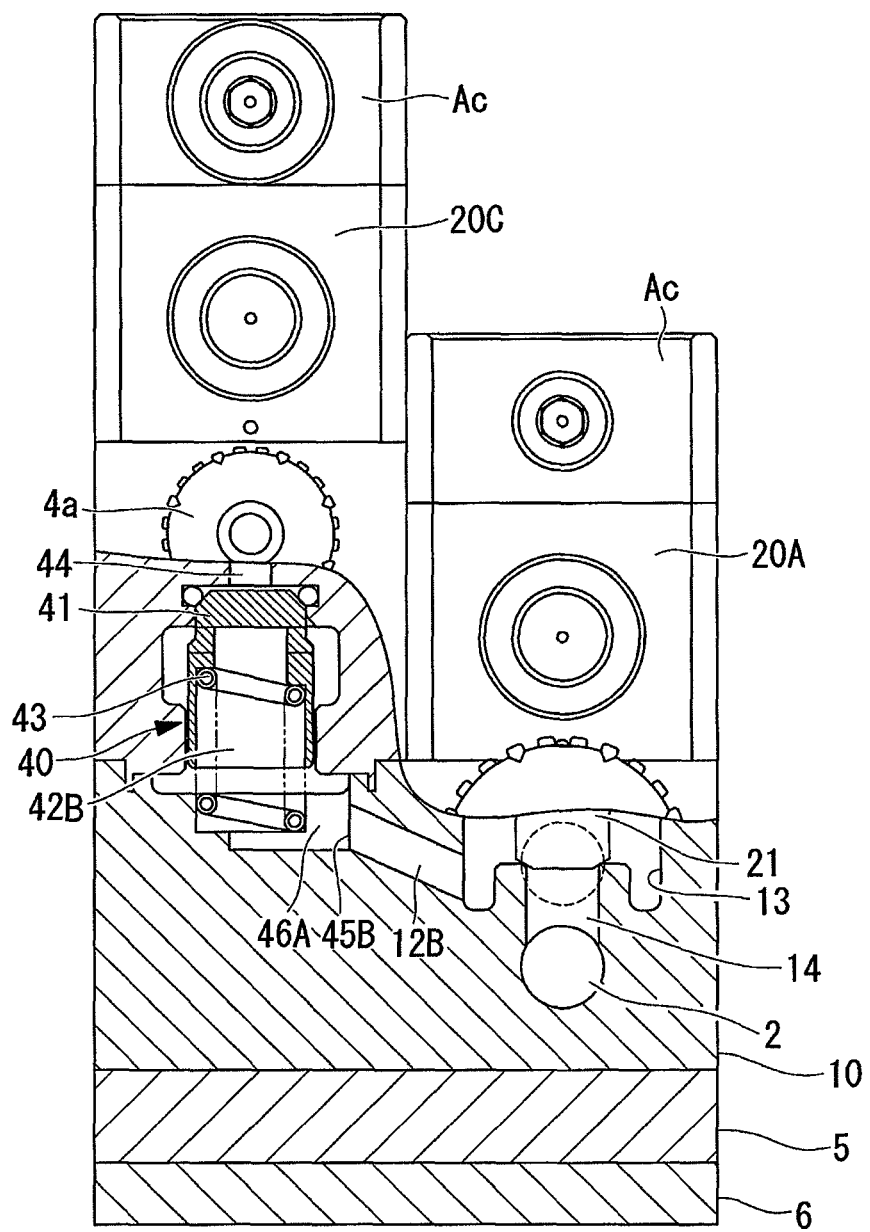
FIG. 15 is a sectional view of principal parts showing a second modification of the valve-member housing in FIG. 2.

In a second modification shown in FIG. 15, a valve-member housing 42B formed in the base member 10 is shallow so as to be capable of partially accommodating the lower portion of the spring 43. The valve-member housing 42B is formed close to the lower end portion of the spring 43 and has a connecting space 46A that is enlarged at the cylindrical space 13 side. The bottom surface of the connecting space 46A corresponds to the lowest end portion of the valve-member housing 42B, and a fluid outlet 45B is disposed at a side surface close to the bottom surface.

The fluid outlet 45B and the cylindrical space 13 that accommodates the valve member 21 of the pneumatically operated valve 20A are connected by an inclined channel 12B formed inside the base member 10. The inclined channel 12B in this case is downwardly inclined from the connecting space 46A toward the cylindrical space 13.

With this configuration, when flowing through the check valve 40, the fluid always flows through the connecting space 46A that is at the lowest position in the valve-member housing 42B. Accordingly, the fluid, which is retained in the connecting space 46A due to closing of the check valve 40, flows out in such a manner as to be pushed out from the connecting space 46A every time the check valve 40 opens and is then replaced. Accordingly, it is possible to prevent the fluid from being retained in the valve-member housing 42B for a long period of time without being replaced, thus preventing the connecting space 46A from becoming a dead volume of the fluid. With this configuration, although the height of the portion where the check valve 40 is installed increases, the fluid flows without being retained because it flows according to the laws of nature, i.e., flowing from a high position to a low position.

In addition, because the flowing direction is upward in the inclined channel 12A, the fluid is retained in the inclined channel 12A and the connecting space 46, which still causes the dead volume. If sufficient height is available, it is possible to form a channel that is completely free of dead volume by forming it as the inclined channel 12B.

The cylindrical space 13 in the first mounting surface 11A and the channel space 16 in the third mounting surface 11C, described above, are connected by the inclined channel 12 that is a part of the pure water channel 4. This inclined channel 12 is formed by inserting a tool such as a drill from the third mounting surface 11C disposed at a high position into the channel space 16; therefore, it is possible to machine the inclined channel 12 having a larger inclination as the step between it and the cylindrical space 13 increases.

Specifically, by increasing the step between the neighboring mounting surfaces 11, the inclined channel 12 having a large inclination angle can be easily formed without providing a machining hole; therefore, a gap between the mounting surfaces 11 capable of being connected by this inclined channel 12 can be decreased. In other words, by providing the step between the neighboring mounting surfaces 11 of the base member 10 and connecting them with the inclined channel 12, it is possible to reduce the installation gap between the fluidic devices attached on the mounting surfaces 11. In this case, the larger the step, the larger the inclination angle of the inclined channel 12, thus enabling reduction of the installation gap.

Figure 11:
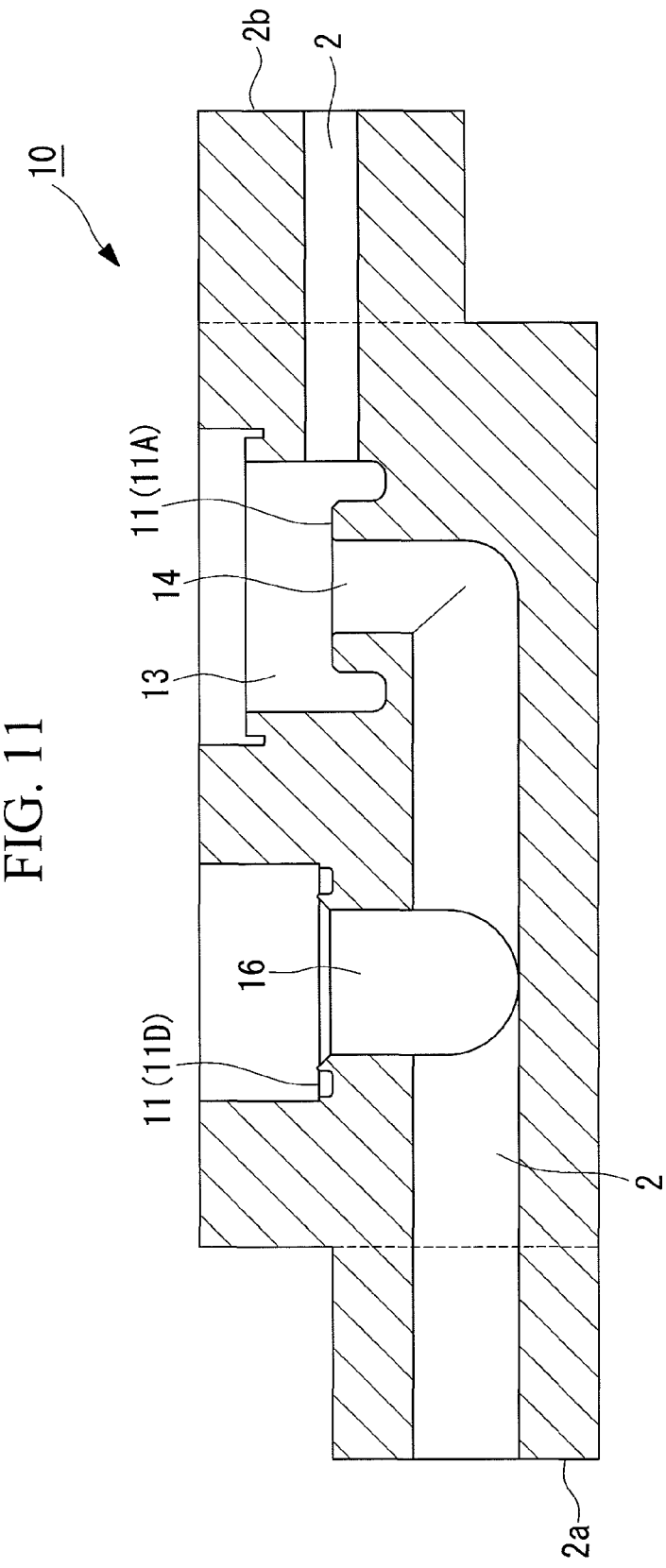
FIG. 11 is a sectional view taken along line G-G in FIG. 7.

In addition, as shown in FIG. 11 for example, it is also possible to reduce the installation gap between the neighboring fluidic devices by connecting a horizontal channel, such as the chemical solution channel 2; however, machining of such a horizontal channel must be performed from a side face of the base member 10 using a tool such as a drill. Accordingly, a machining hole can be used when the base member 10 communicates with the exterior; however, when the fluidic devices are connected inside the base member 10, the machining hole provided in the side face of the base member 10 needs to be sealed by covering it.

Figure 8:
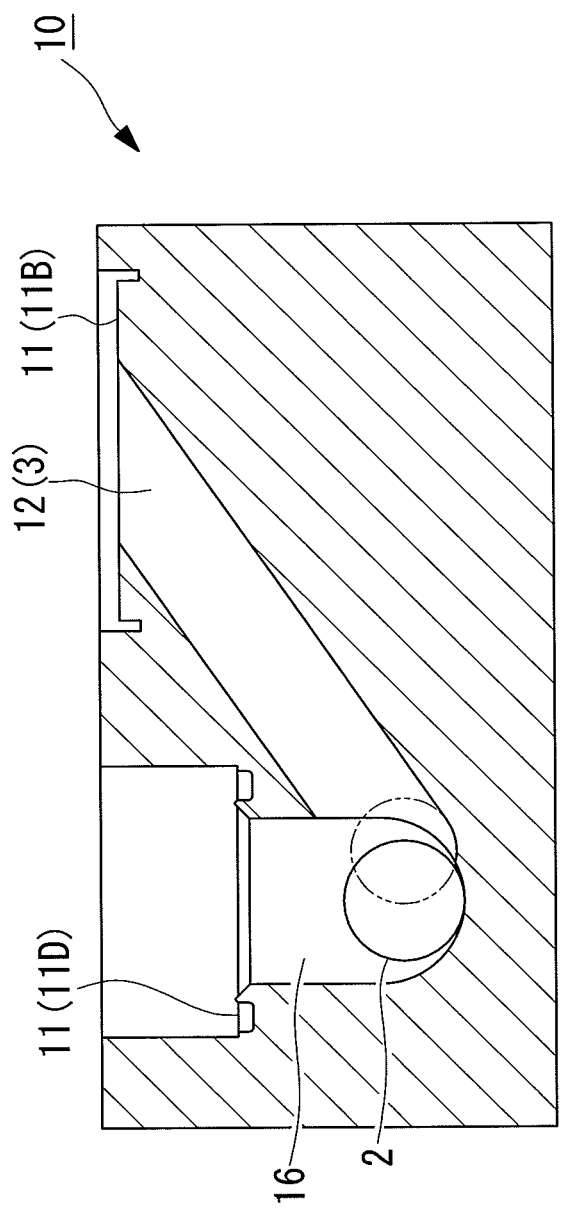
FIG. 8 is a sectional view taken along line D-D in FIG. 7.

Similarly, as shown in FIG. 8, between the second mounting surface 11B and the fourth mounting surface 11D, the inclined channel 12 serving as the chemical solution return channel 3 is formed from the high-step second mounting surface 11B side, which is formed so as to substantially align with the top surface of the base member 10, toward the low-step fourth mounting surface 11D side, which is formed in such a manner that the top surface of the base member 10 is depressed. In addition, reference numeral 16 in the drawing denotes a channel space formed below the fourth mounting surface 11D.

Figure 1:
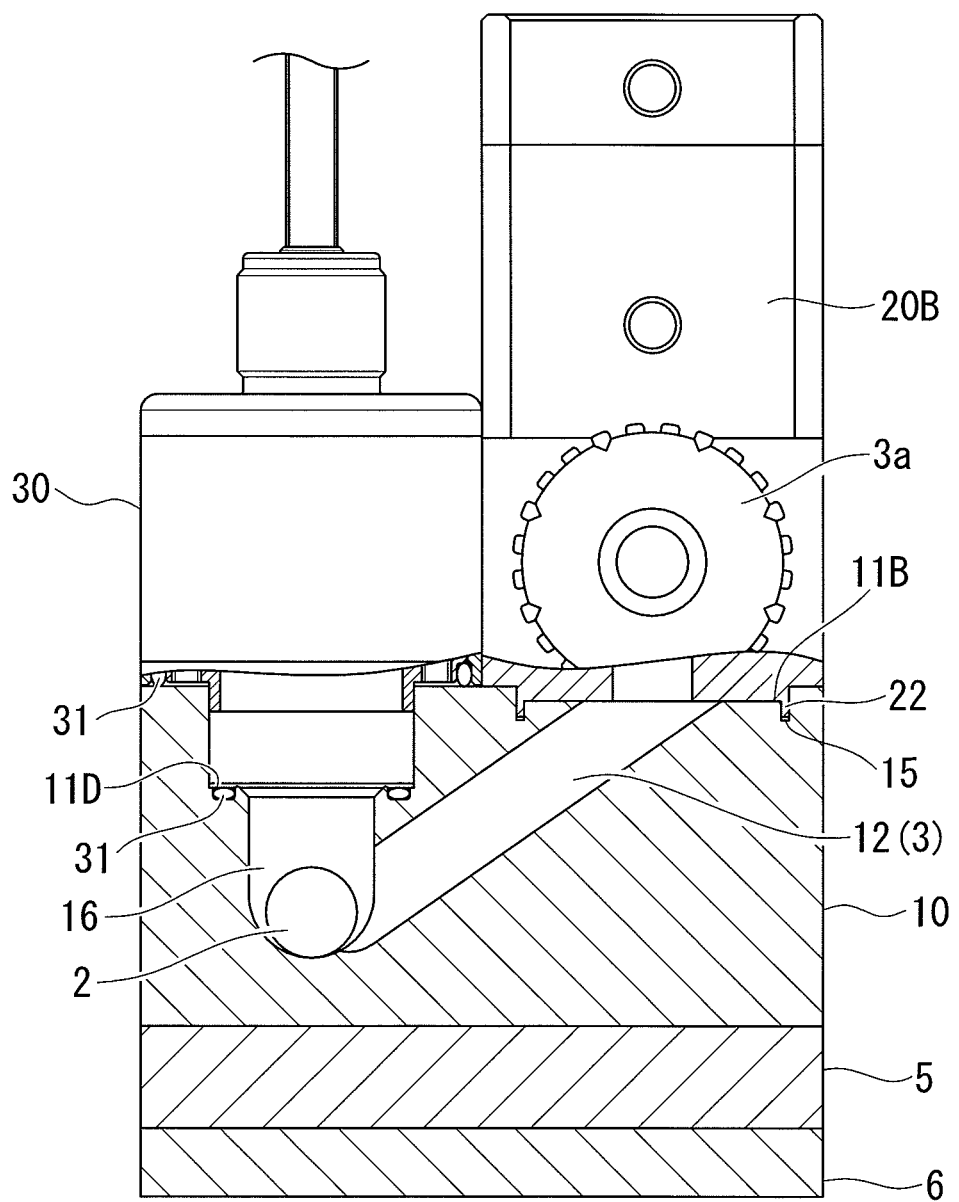
FIG. 1 is a sectional view of principal parts (taken along line A-A in FIG. 5), showing an embodiment of a fluidic device unit structure according to the present invention.

As shown in FIG. 1, for example, the pneumatically operated valve 20B is attached to the second mounting surface 11B by inserting it from above, and the pressure sensor 30 is attached to the fourth mounting surface 11D by inserting it from above. In addition, the connecting portion of the pneumatically operated valve 20B is sealed by fitting the ring-shaped protruding portion 22 into the ring-shaped recessed portion 15, and the connecting portion of the pressure sensor 30 is sealed by pressing an O-ring 31 while holding it.

Figure 3:
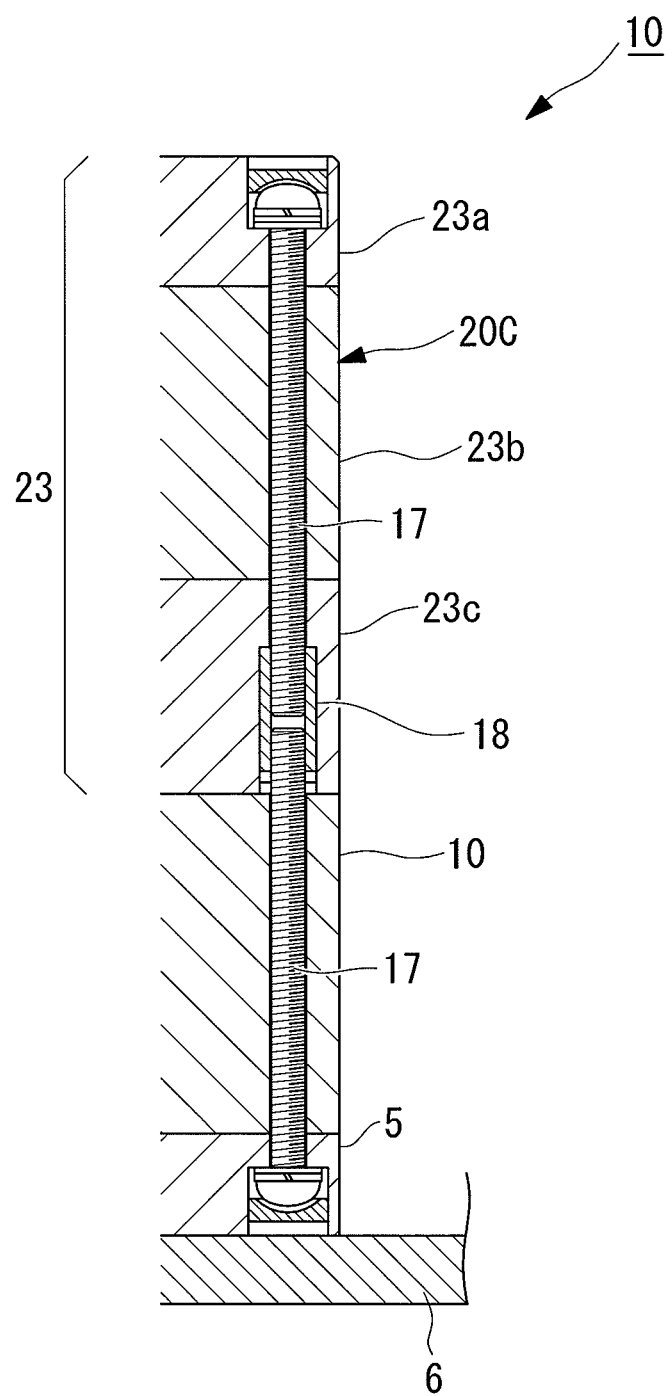
FIG. 3 is a sectional view of principal parts (taken along line C-C in FIG. 5), showing an embodiment of a fluidic device unit structure according to the present invention.

As shown in FIG. 3 for example, tightening with the bolt 17 having the above-described split bolt structure is performed by dividing a casing member 23 of the fluidic devices into multiple parts in the direction joining with the base member 10, by forming a female threaded portion 18, which penetrates in the joining direction, at a base-side member 23c of the casing member 23 that is disposed at a position in close contact with the base member 10, and the base-side member 10 is held and tightened by screwing the separate bolts 17 and 17 into the female threaded portion 18 from both sides. When tightening with the bolts 17 in this way, it is preferable to uniformly place the bolts 17 by distributing them, for example, at four corners of a rectangular cross section. In addition, the above-described female threaded portion 18 may be formed of, for example, an embedded nut or the like in which a reverse female thread is formed from both sides to the center.

As a result, adjustment of the tightening force of each bolt 17 becomes easy, and it is possible to adjust a force for placing the casing member 23 in close contact with the base member 10; therefore, superior sealing properties can be obtained by uniformly tightening a plurality of sealing portions.

Figure 12:
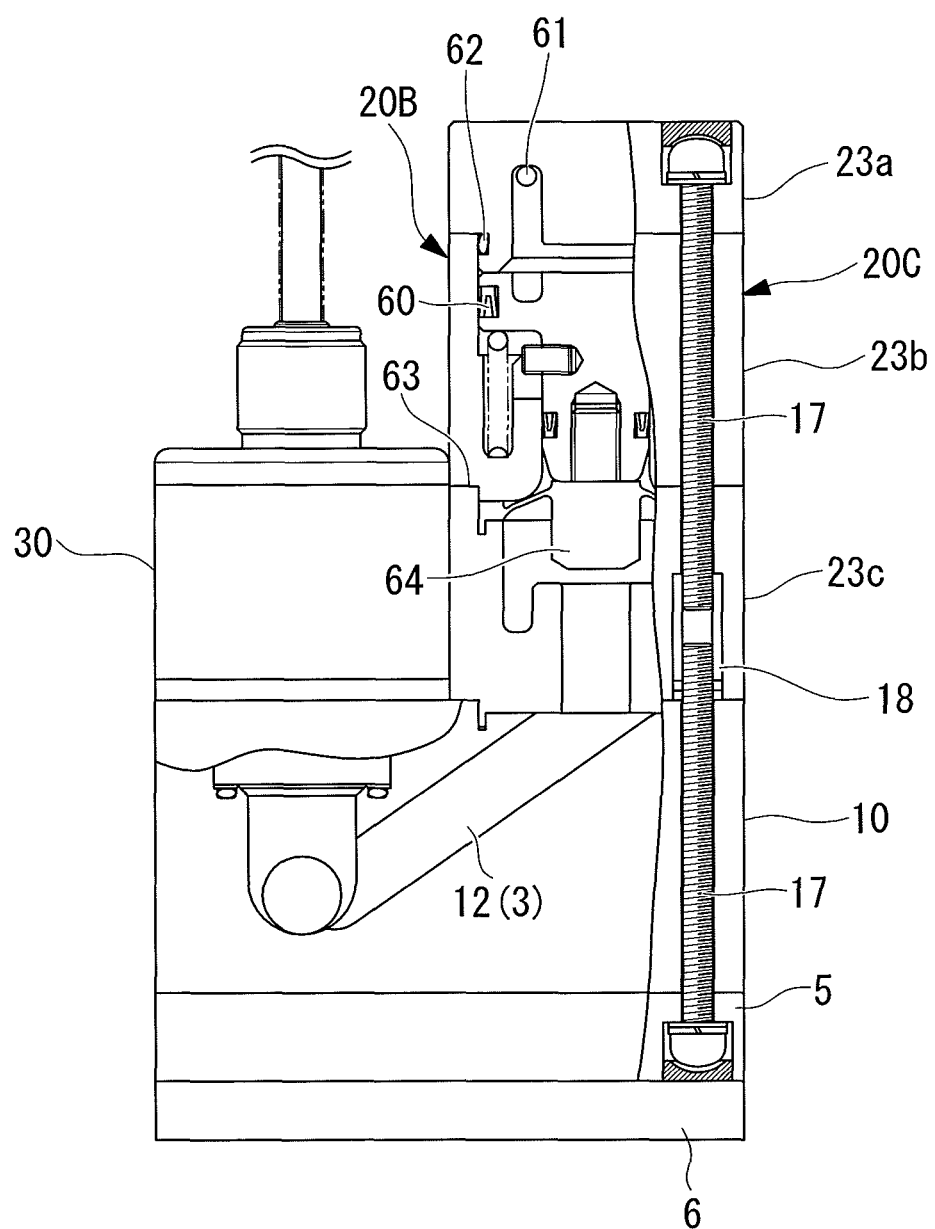
FIG. 12 is a sectional view showing a specific example of a split bolt structure.

The above-described split bolt structure will be described in detail below based on FIG. 12 in which a concrete example is shown.

With the above-described split bolt structure using the bolts 17 and the female threaded portion 18, when the casing member 23 of the pneumatically operated valve 20B is installed in the base member 10, the female threaded portion 18 penetrating in the joining direction is formed on a base surface of a base-side member (valve seat body) 23c that is disposed at a position in close contact with the base member 10, and the base member 10 is held and tightened by screwing the separate bolts 17 and 17 into the female threaded portion 18 from both sides. In general, it may employ a configuration in which the pneumatically operated valve 20B is secured to the base member 10 using a single through-bolt 50 shown in FIG. 2; however, because the actuator of the pneumatically operated valve 20B is a pneumatic opening and closing valve, many sealing portions are provided at the pneumatically operated valve 20B when considering it as a single unit. Accordingly, if all sealing portions are assembled with a single through-bolt 50, it makes the assembly and inspection processes complicated, which is undesirable.

In other words, in addition to O-ring sealing portions 60, 61, and 62 for ensuring pneumatic operation, the pneumatically operated valve 20B is formed of a sealing portion 63 that ensures sealing properties of the fluid flowing in the interior of the pneumatically operated valve 20B, and a sealing portion 64 that ensures sealing when opening and closing the valve member. Regarding these sealing portions, it requires extremely difficult and complicated processing to confirm their sealing properties after installing them in the base member 10. Furthermore, if any leakage exists somewhere, all parts must be disassembled to deal with it; therefore, the assembly process becomes complicated, which is undesirable.

In addition, with the above-described fluidic device unit 1, because a plurality of fluidic devices are integrated, a plurality of fluidic devices that have many sealing portions serving as a single unit, such as the pneumatically operated valve 20B, are provided in the base member 10. Accordingly, after integrating the fluidic devices, there are many sealing portions in the completed unit whose sealing properties must be checked, and therefore, the operation for realizing leakage inspection of each sealing portion is an extremely complex process.

In addition, if any leakage exists, all parts need to be reinstalled after being disassembled, and it is also very difficult to identify the leakage location. Accordingly, there is a risk of having to perform re-assembly in the assembling process, and it is also necessary to simplify inspection.

Accordingly, without using the through-bolt 50 shown in FIG. 2, when employing the split bolt structure using the female threaded portion 18 and the bolts 17, it is possible to treat the pneumatically operated valve 20B as a single unit. In other words, by using the female threaded portion 18 and the bolts 17, it is possible to design a production process in which the pneumatically operated valve 20B is treated as a single unit, and also to install the pneumatically operated valve 20B in the base member 10 after confirming each sealing property as a single unit.

Eventually, the pneumatically operated valve 20B is installed on the first mounting surface 11A in the base member 10, and the bolts 17 are inserted from below the base and are screwed into the female threaded portion 18, thus completing an integrated circuit of fluidic devices. In addition, when inspecting the sealing of the fluidic device unit 1, only the fitting portions of the ring-shaped protruding portion 22 and the ring-shaped recessed portion 15 that are the sealing portions of the base member 10 should be inspected. Accordingly, inspection for an assembly line of the units can be simplified, and during the leakage inspection, the cause can be easily identified.

In addition, when considered from the viewpoint of the delivery of the above-described fluidic device unit 1, regarding the fluidic devices such as the pneumatically operated valve 20B, if the various kinds of similar devices having different specifications and functions are produced in advance and stocked in an appropriate amount, after installing the devices that are appropriately selected according to customers' requests into the base member 10, the leakage inspection can be carried out only for the fitting portions of the ring-shaped protruding portion 22 and the ring-shaped recessed portion 15, followed by shipment.

Figure 13:
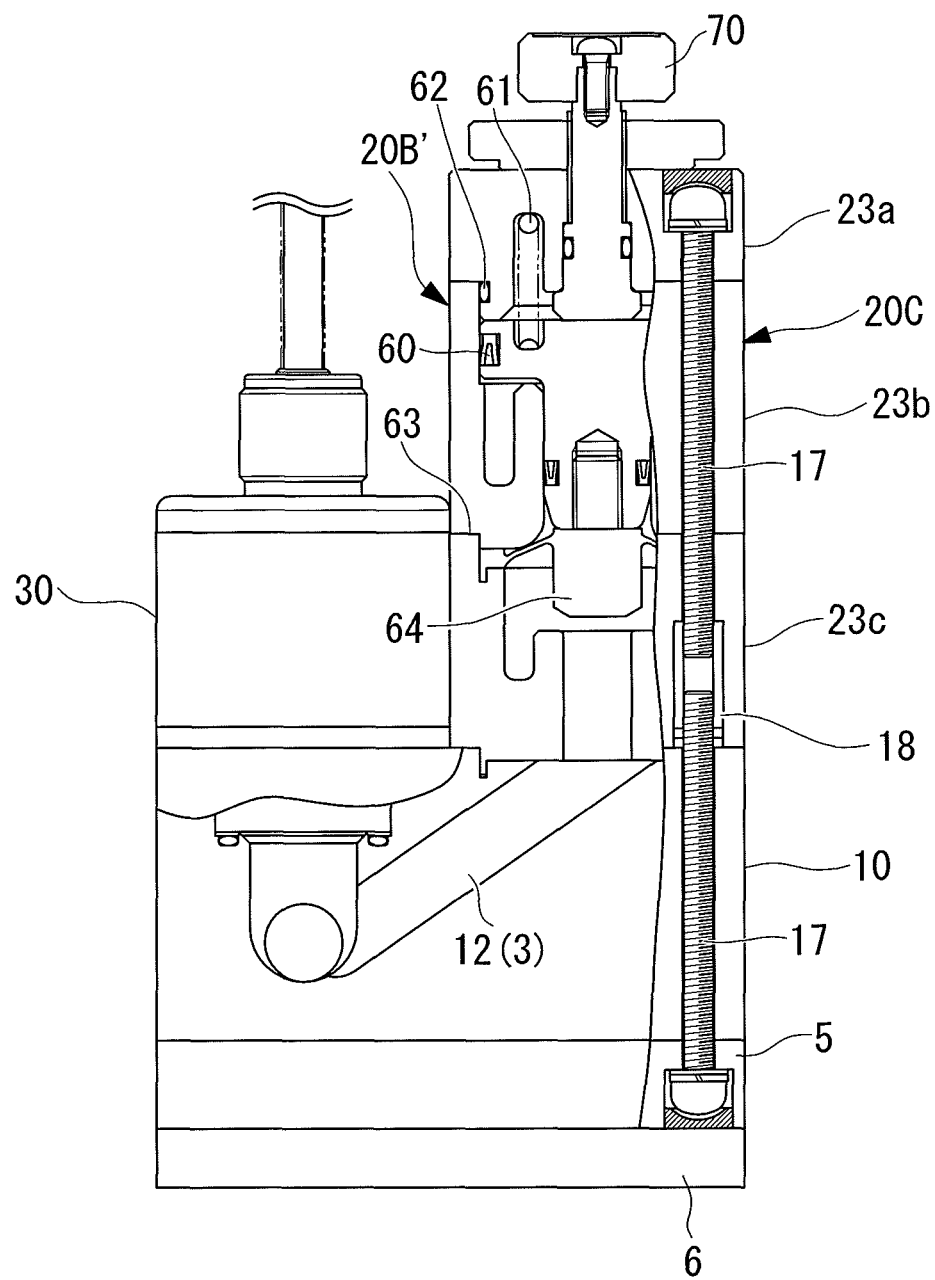
FIG. 13 is a sectional view showing another specific example of a split bolt structure.

The above-mentioned devices similar to the fluidic devices include various kinds of devices, for example, with different opening/closing modes, such as normally opened or normally closed, and devices with or without a flow adjusting function. It is not limited to the devices illustrated, however; it also includes a device having many sealing portions serving as a single fluidic device. FIG. 13 shows a pneumatically operated valve 20B' that has an adjusting function with an adjusting knob 70 at the top.

As described above, the fluidic device unit structure of the present invention is configured such that a plurality of the mounting surfaces 11 of the fluidic devices are formed in the base member 10 by providing the steps and are connected by the inclined channels 12 in the interior of the base member. Accordingly, the fluidic devices can be integrated by reducing the gaps between the neighboring fluidic devices, and a fluidic device unit structure which is particularly effective in reducing the footprint can be realized. In addition, regarding devices handling chemicals and so forth, although there is a strong demand to reduce the installation space generally by reducing the footprint, there is still enough space in an upper area. Accordingly, even when the fluidic device unit 1 becomes almost as large as the steps between the mounting surfaces in the vertical direction, this is relatively easily to cope with; therefore, the effect of the footprint reduction obtained thereby becomes large.

In addition, with the above-described fluidic device unit structure, because pipes and joints required for connecting the fluidic devices are reduced in number, an advantage is afforded in that reliability is improved by reducing the number of leak points and maintenance is simplified.

In addition, with the above-described fluidic device unit structure, because the fluidic devices are disposed in close contact, the dead space volume where the fluid remains is reduced, thus making it possible to use the space without waste, particularly when handling expensive chemical solution.

Furthermore, with the above-described fluidic device unit structure, since a check valve suitable for integrating the fluidic devices can be obtained, the footprint of the fluidic device unit structure can be reduced even more. In particular, with the fluidic device unit structure provided with the check valve, because the fluid flowing through the check valve passes through the lower end of the valve-member housing, the problem of fluid retention in the valve-member housing can be eliminated.

With the above-described embodiment, four mounting surfaces 11 are provided in the base member 10. However, the number of the mounting surfaces 11, the positions thereof, and so forth are not particularly limited; they can be changed according to the number of the fluidic devices to be combined as a unit. In addition, if the connecting structure between the mounting surfaces 11 and the fluidic devices is designed for the split bolt structure using the female threaded portion 18, by keeping a stock of devices similar to the fluidic devices, it is possible to install the fluidic devices in various combinations by sharing the base member 10. In addition, by keeping a stock of the fluidic devices, quick delivery response is possible compared with when assembling the devices from scratch.

The present invention is not restricted to the embodiment described above. Suitable modifications can be made so long as they do not depart from the spirit of the present invention.

The invention claimed is:

1. A fluidic device, comprising:
  a single base member defining first and second surfaces;
  a first inlet in the base member the first inlet adapted to receive a first fluid;
  a second inlet in the base member, the second inlet adapted to receive a second fluid;
  a first outlet in the base member, the first outlet adapted to discharge a third fluid;
  a first fluidic device disposed on the first surface, the first fluidic device being downstream of the first inlet;
  a second fluidic device disposed on the second surface, the second fluidic device being downstream from the first fluidic device and also downstream from the second inlet;
  a check valve disposed within the single base member, beneath the first fluidic device;
  a valve-member housing space defined within the single base member, the valve-member housing space containing the check valve and being in line with the first fluidic device;
  a first space defined within the single base member, beneath the valve-member housing space and in line with the valve-member housing space, in fluidic communication with the valve member housing space such that the first fluid flows downwardly from the valve-member housing space into the first space;
  a second space defined within the single base member, the second space being in line with the second fluidic device but out of line with the check valve, the second space being adapted to receive both the first fluid and the second fluid; and
  an inclined channel connecting the first space to the second space, the inclined channel being inclined upwardly to convey the first fluid from the first space to the second space.

2. The fluidic device according to claim 1, wherein the second fluidic device is attached to the single base member via a mounting surface included in the single base member.

3. The fluidic device according to claim 1, wherein the first fluidic device is a pneumatically operated valve.

4. The fluidic device according to claim 1, wherein the second fluidic device is a pneumatically operated valve.

5. The fluidic device according to claim 1, wherein the first mounting surface and the second mounting surface are not coplanar.

6. The fluidic device according to claim 1, further comprising:
  a pressure sensor disposed on the single base member, the pressure sensor being disposed downstream from the second inlet and upstream from the second fluidic device.

7. The fluidic device according to claim 1, further comprising:
  a first fluid channel extending from the first inlet, through the first fluidic device and the check valve to the second fluidic device, the first fluid channel being adapted to convey the first fluid;
  a second fluid channel extending from the second inlet to the second fluidic device, the second fluid channel being adapted to convey the second fluid; and
  a third fluid channel extending from the second fluidic device to the first outlet, the third channel being adapted to convey the third fluid.

8. The fluidic device according to claim 7, wherein the first fluid channel is split off from the second fluid channel and the third fluid channel.

9. The fluidic device according to claim 7, further comprising:
  a pressure sensor disposed on the single base member, the pressure sensor bring disposed along the second fluid channel.

10. The fluidic device according to claim 9, further comprising:
  a second outlet in the base member;
  a fourth fluid channel extending from the pressure sensor to the second outlet; and
  a third fluidic device disposed along the fourth fluid channel.

11. The fluidic device of claim 10, wherein the third fluidic device is a pneumatically operated valve.

12. A fluidic device, comprising:
a single base member defining first and second surfaces;
a first inlet in the base member, the first inlet adapted to receive a first fluid;
a second inlet in the base member, the second inlet adapted to receive a second fluid;
a first outlet in the base member, the first outlet adapted to discharge a third fluid;
a first fluidic device disposed on the first surface, the first fluidic device being downstream of the first inlet;
a second fluidic device disposed on the second surface, the second fluidic device being downstream from the first fluidic device and also downstream from the second inlet;
a check valve disposed within the single base member;
a valve-member housing space defined within the single base member, the valve-member housing space containing the check valve and being in line with the first fluidic device;
a first space defined within the single base member, beneath the valve-member housing space and in line with the valve-member housing space, in fluidic communication with the valve-member housing space such that the first fluid flows downwardly from the valve-member housing space in the first space;
a second space defined within the single base member, the second space being in line with the second fluidic device but out of line with the check valve, the second space being adapted to receive both the first fluid and the second fluid; and
an inclined channel connecting the first space to the second space, the inclined channel being inclined downwardly to convey the first fluid from the first space to the second space.

13. The fluidic device according to claim 12, wherein the second fluidic device is attached to the single base member via a mounting surface included in the single base member.

14. The fluidic device according to claim 12, wherein the first fluidic device is a pneumatically operated valve.

15. The fluidic device according to claim 12, wherein the second fluidic device is a pneumatically operated valve.

16. The fluidic device according to claim 1, wherein the first mounting surface and the second mounting surface are not coplanar.

17. The fluidic device according to claim 12, further comprising:
a pressure sensor disposed on the single base member, the pressure sensor being disposed downstream from the second inlet and upstream from the second fluidic device.

18. The fluidic device according to claim 12, further comprising:
a first fluid channel extending from the first inlet, through the first fluidic device and the check valve to the second fluidic device, the first fluid channel being adapted to convey the first fluid;
a second fluid channel extending from the second inlet to the second fluidic device, the second fluid channel being adapted to convey the second fluid; and
a third fluid channel extending from the second fluidic device to the first outlet, the third channel being adapted to convey the third fluid.

19. The fluidic device according to claim 18, wherein the first fluid channel is split off from the second fluid channel and the third fluid channel.

20. The fluidic device according to claim 18, further comprising:
a pressure sensor disposed on the single base member, the pressure sensor bring disposed along the second fluid channel.

21. The fluidic device according to claim 20, further comprising:
a second outlet in the base member;
a fourth fluid channel extending from the pressure sensor to the second outlet; and
a third fluidic device disposed along the fourth fluid channel.

22. The fluidic device of claim 21, wherein the third fluidic device is a pneumatically operated valve.

* * * * *